Figure 1:
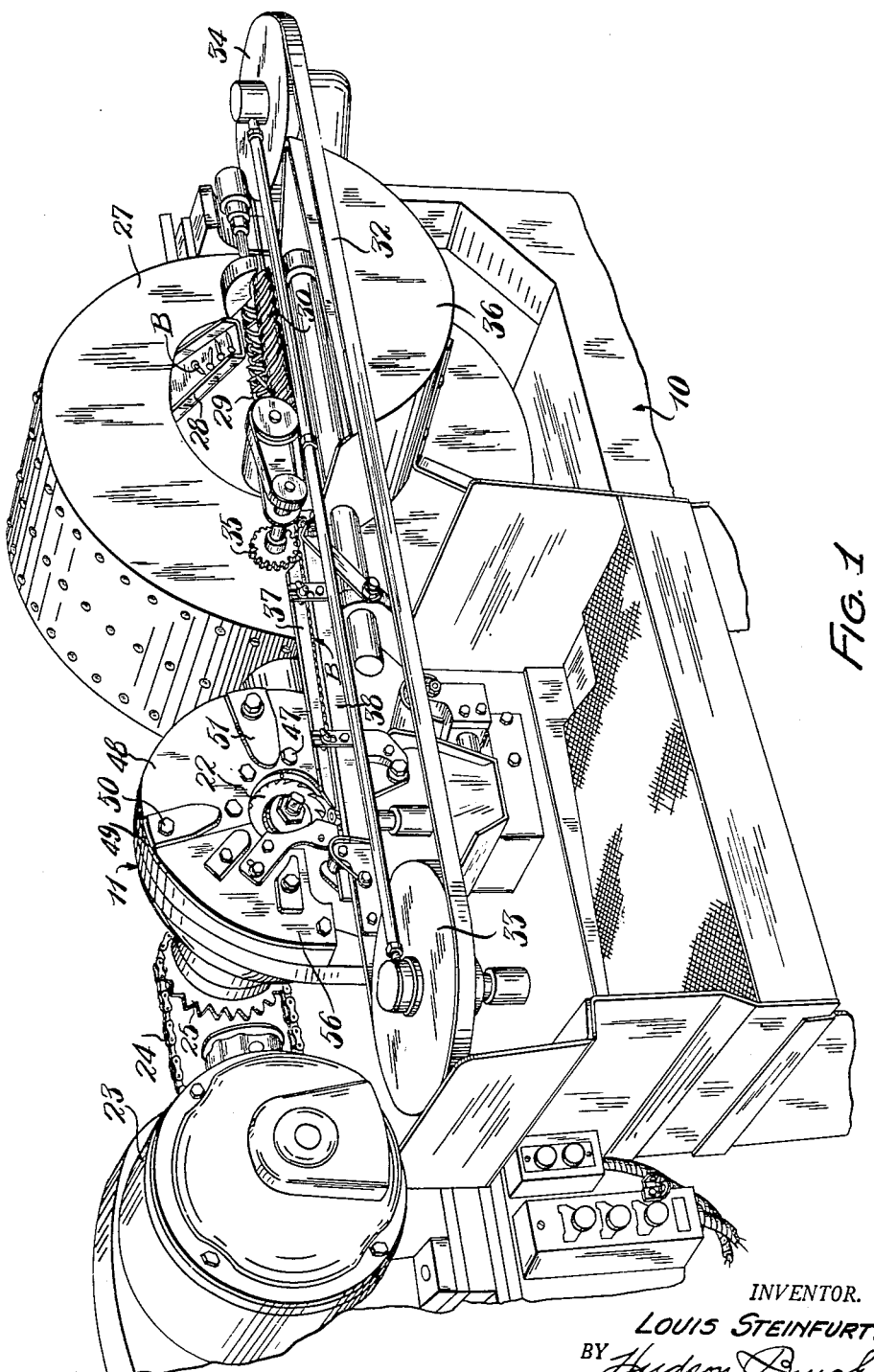

April 17, 1956  L. STEINFURTH  2,741,783
SCREW BLANK RESILIENT BIASING MEANS MOUNTED ON ROTARY CARRIER
Filed May 21, 1952  2 Sheets-Sheet 1

INVENTOR.
LOUIS STEINFURTH
BY Hudson, Doughton,
Williams, David & Hoffmann
ATTORNEYS

United States Patent Office 2,741,783
Patented Apr. 17, 1956

2,741,783

SCREW BLANK RESILIENT BIASING MEANS MOUNTED ON ROTARY CARRIER

Louis Steinfurth, East Cleveland, Ohio, assignor to The National Screw & Manufacturing Company, Cleveland, Ohio, a corporation of Ohio Application May 21, 1952, Serial No. 289,055

2 Claims. (Cl. 10—6)

This invention relates to machines for effecting sawing, milling or like operations on the ends of articles having elongated cylindrical portions. More particularly, the invention relates to an improved means for holding screw blanks or like articles while the heads thereof are being slotted by sawing, milling or like operations.

The formation of screw driver grooves or slots in the heads of screw blanks is effected, in one type of machine, by means of a circular cutting tool past which the blanks are moved in an arcuate path. In this type of machine the blanks are carried in the arcuate path by being received in radially extending grooves or slots in the end face of a rotatable carrier which is eccentrically mounted with respect to the cutting tool and which rotates past a stationary member while the tool is engaging the blank heads to thereby hold the blanks within the recesses or grooves during the slotting operation. Successful operation of such a machine requires that the blanks be securely held when the tool is in engagement therewith. Unfortunately, however, the blanks are not all of uniform diameter and slight variations in that diameter are sufficient to prevent secure holding of the blanks with consequent spoilage of the blanks and/or damage to the tool. Similar problems and difficulties are encountered where screw blanks and other like articles are being held in this manner for the performance of operations other than head slotting.

An object of this invention is to provide an improved carrier member for a machine of the type described above wherein the rotatable carrier member has means for individually maintaining each article or blank in firm engagement with a stationary member while the machining operation is being performed so that variations in diameter of the blanks or other articles do not prevent the latter from being securely held from movement relative to the carrier, thereby reducing spoilage, increasing tool life and permitting an increased rate of production.

Another object of the invention is to provide an improved carrier member for a machine of the type defined above with an axially movable plunger for each blank-receiving recess of the carrier, which plunger is resiliently held against the shank of the screw blank or other article positioned in the recess to maintain the latter in firm engagement with the stationary member past which the carrier rotates during the machining operation.

Figure 2:
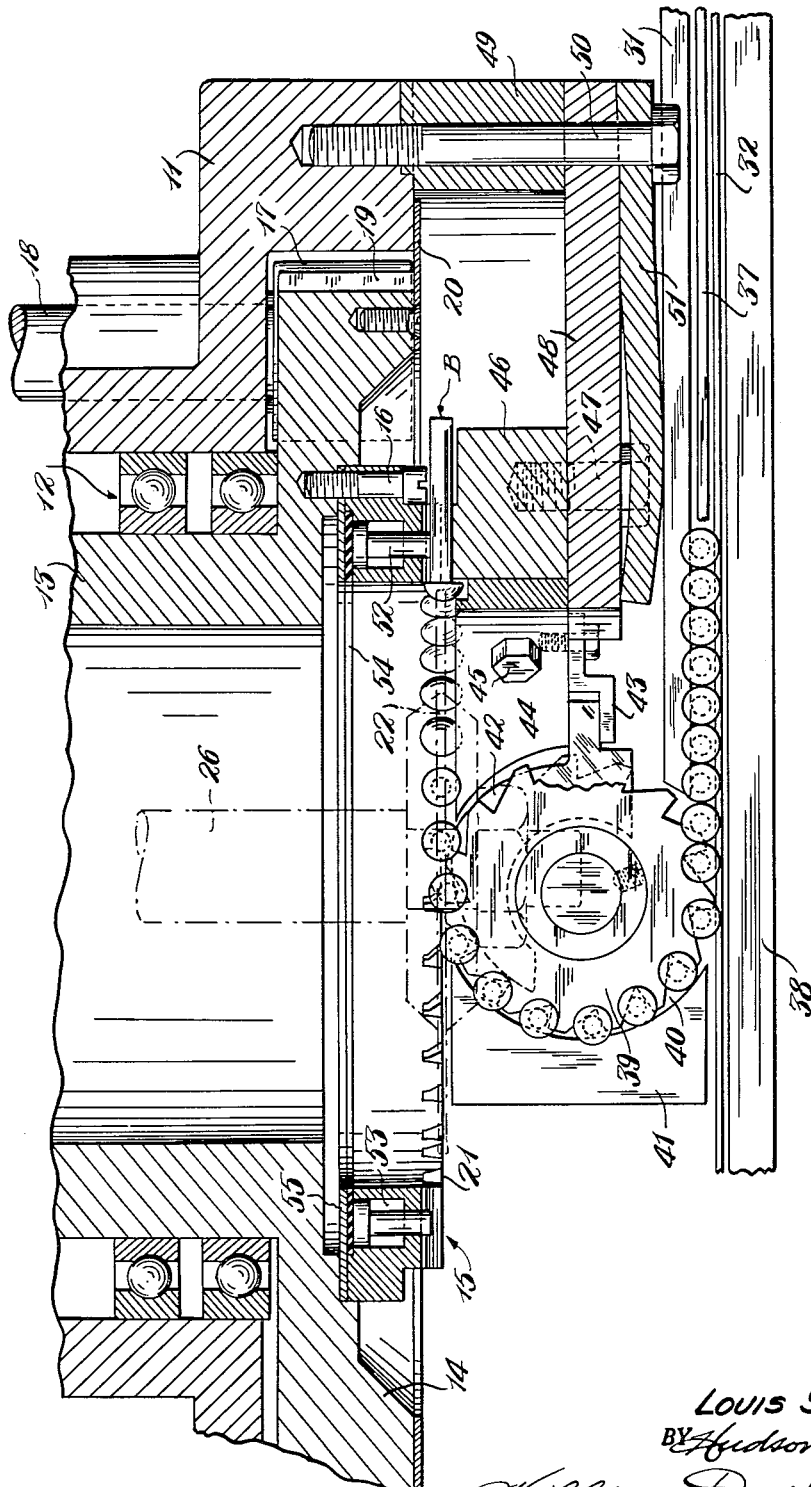

The invention further resides in certain novel features of the construction and arrangement of the parts of the apparatus, and further objects and advantages of the invention will be apparent to those skilled in the art to which the invention pertains from the following description of the present preferred embodiment thereof, described with reference to the accompanying drawings, in which:

Fig. 1 is a perspective view of a machine for slotting headed screw blanks and embodying the novel blank carrier of the present invention; and Fig. 2 is an enlarged fragmentary view, principally in section approximately on the center line of the carrier with the cutting tool indicated only in dot-dash lines.

The invention is here illustrated as embodied in a high production machine capable of slotting the heads of screw blanks whose shanks are in the order of one-half inch in diameter, or smaller, at the rate of 1,000 or more per minute. It will be understood, however, that the invention is not necessarily limited to high speed operations with screw blanks of the size stated and that the novel carrier member about to be described may be employed with machines for performing other types of operations.

The machine shown in Fig. 1 of the drawing comprises a base or frame 10 which supports a housing 11 in which the slotting or machining operation is effected. The housing 11 is provided with suitable bearings 12, see Fig. 2, which rotatably support a tubular spindle 13 with its axis extending horizontally. The forward portion of the spindle 13 is provided with a radially extending flange 14 having a cylindrical recess in which is secured an annular carrier member 15, the carrier member being secured to the flange 14 of the spindle by suitable means such as screws 16, or the like.

The spindle 13 and the carrier member 15 are adapted to be rotated by any suitable driving means. In the illustrated embodiment, this driving means comprises a pinion 17 which is connected to the forward end of a shaft 18 journalled in the housing 11 and driven by any suitable means, not shown. The pinion 17 is in continuous mesh with gear teeth 19 formed upon the outer periphery of the flange 14. The flange 14 has an annular member 20 secured thereto the outer periphery of which extends over and rides upon an internal flange of the housing 10 thereby providing a shield or guard for the gears preventing entrance of dirt or chips.

The carrier member 15 is annular in configuration and the forward end face thereof is provided with a series of equally spaced, radially extending recesses or grooves 21 for receiving the articles which are to be slotted and which in the illustrated embodiment are screw blanks B. The side walls of the recesses or grooves 21 are substantially planar with the rear or trailing wall, as measured in the direction of rotation of the carrier, making an angle of approximately 76° with the face of the carrier and the other side or wall of the recess making an angle of about 40° with the face of the carrier. The forward sloping walls terminate short of the depth of the recesses or grooves and merge with a substantially axially extending wall, as shown in the drawings.

The blanks are delivered into the recesses or grooves 21 of the carrier 15 as hereinafter described and are firmly retained therein against movement relative to the carrier while the latter rotates past a circular saw 22. This saw is of less diameter than the interior diameter of the carrier and the axis of the saw is eccentrically disposed with respect to the carrier so that the saw engages the heads of the blanks B during a portion of the revolution of the carrier since the blanks are fed into the carrier with their heads inwardly directed. Because of the eccentric mounting of the saw, the slotting operation is effected during only a portion of the rotation of the annular member or carrier 15 so that the remainder of that rotation is available for feeding the blanks into the carrier and for removing the slotted blanks therefrom, as will be readily understood from prior art machines of similar nature.

The saw or other slotting tool 22 may be driven in any convenient manner, the drive being here indicated as comprising an electric motor 23 which is connected by a chain 24 to a sprocket 25 provided on the shaft 26 of the saw. It will also be understood that the shaft 26 may be adjusted radially relative to the spindle 13 to adjust the depth of cut, thereby enabling compensation for wear and to adapt the mechanism for operation upon blanks of various sizes. Likewise, axial adjustment of the saw may be provided.

The articles or blanks B which are to be slotted may be fed to the carrier 15 in any convenient manner, the feed means here shown being illustrative of one type which may be employed. This feeding means is described and claimed in the copending applications of Victor H. Fray, Serial No. 95,492, filed May 26, 1949, entitled "Hopper Feed Apparatus for Metal Thread Screw Blanks and the Like," now Patent No. 2,639,445 issued May 26, 1953, on Serial No. 182,976, filed September 2, 1950, entitled "Screw or Like Nicking Machines" now Patent No. 2,685,-698 issued August 10, 1954, and, hence, the details need not here be repeated. It is sufficient for the present purposes to note that this mechanism comprises a hollow feeding hopper or drum 27 supported for rotation about a horizontal axis in which the blanks are placed in non-oriented condition. This hopper is provided with one or more axially and radially extending vanes or steps on the inner periphery thereof which tend to carry a portion of the blanks B upwardly therein, which blanks then drop upon a discharge chute 28 and gravitate to the region between oppositely rotating rollers 29 and 30. These rollers are provided with inclined helical grooves and lands which cooperate to orient the blanks with their heads uppermost and to dispose the shanks of the blanks between a stationary guide bar 31 and an adjacent reach of a traveling feed belt or band 32.

The feed band 32 encircles pulleys 33 and 34, rotating about spaced vertical axes, one of which pulleys is driven by a means not shown and at a suitable speed to move the blanks B which have entered the space between the belt or band and the bar 31. Preferably the upper edge of the band 32 is at a slightly higher elevation than the bar 31 so that the latter serves simply as a guide for the shanks while the undersides of the heads of the blanks B rest upon the band 32 and are carried by the latter. Blanks which are not properly positioned with their heads in engagement with the band 32, or those which have bent shanks or other deformities, are automatically removed by the rotating toothed wheel 35 which is located just in advance of the rollers 29, 30 and is suitably driven so that its periphery is moving in the opposite direction to the movement of the blanks as carried by the band. Any blanks thus removed drop into a container 36 provided beneath the rollers 29 and 30.

As the blanks are fed forwardly by the band 32 they are retained in single file order and prevented from riding upwardly upon one another by an adjustable bar 37 extending immediately above the heads of the blanks. Spreading of the band relative to the stationary member 31 is prevented by a rigid bar or member 38 located closely adjacent the inner periphery of the band 32 opposite the bar 31. This bar or member 38 extends beyond the guide bar 31 while the forward end of the guide 31 terminates adjacent the vertical plane containing the axis of the carrier member 15, as will be apparent from Fig. 2. Located adjacent this forward end of the guide member 31, and between the band 32 and the forward face of the carrier 15, is a feeding means comprising a feed wheel 39 supported for rotation about a vertical axis and having a plurality of notches or recesses 40 in its periphery within which the blanks B are ordinarily received as they move beyond the end of the guide member 31. The blanks thus received by the feed means 39 are retained therein as they move from contact with the band 32 into engagement with the carrier 15 by means of a guide member 41 having an arcuate surface adjacent the periphery of the feed member 39.

The speed of rotation of the feeding wheel 39 and the spacing of the recesses 40 thereof are such relative to the spacing of the recesses 21 and the speed of the carrier 15 that a blank B is positioned by the feeding means 39 in position for cooperation with each recess 21 in the carrier member 15 as the said recess moves to the lowermost position of the carrier member. Transfer of the blank B thus aligned with the opening in the recess 21 of the carrier member is effected by a plow-like member 42 having an arcuate surface extending adjacent the carrier member 15, which arcuate surface is of decreasing radius toward the forward end thereof so as to move the shanks of the blanks from the wheel 39 into the recesses 21 of the carrier member. The camming member 42 is suitably connected by a bracket or the like 43 to an arcuate member 44 which, in turn, is connected by means of studs 45 to a relatively massive arcuate member 46. The member 46 is connected by studs 47 to a plate-like member 48 forming a part of the forward closure of the housing or support 11 and which is secured to the latter in spaced relationship thereto by an arculately shaped spacer member 49 and studs 50. The inner edge of the arcuate member 44 adjacent the carrier member 15 is suitably relieved to accommodate the heads of the blanks B as these are carried therepast and, if desired, may be arranged to force said heads into firm engagement with the inner surface of the carrier member 15.

As mentioned heretofore, the blanks B are securely held as they are moved by the carrier 15 past the saw 22. For this purpose the stationary arcuate member 46, sometimes referred to as a pressure or clamp plate, extends adjacent the outer face of the carrier 15 from a point adjacent the location where the blanks are transferred to the carrier to a point beyond that at which the blanks leave contact with the saw 22. This arcuate member 46, which is secured to the inner face of the plate 48 by the studs 47, is spaced from the carrier member 15 a distance such that the shanks of the blanks B in the recesses 21 engage and slide over the member 46 as the carrier is rotated. This contact is ordinarily of sufficient force to maintain the blanks against movement relative to the carrier member during the sawing or other machining operation if the shanks of the blanks are all of uniform diameter, the plate 48 preferably being sufficiently stiff for this purpose. The stiffness of the plate 48 may be increased, if desired, by reinforcing members such as 51 which extend from the periphery of the housing to a point on the opposite side of the member 48 from the face on which the arcuate member 46 is secured.

As just mentioned, the member 46 in conjunction with the carrier member 15 and the member 44 would prevent any movement of the blanks B relative to the carrier during the time when the blanks are in engagement with the saw if the shanks of the blanks were all of uniform diameter. Unfortunately, however, this is seldom the case since in commercial production the blanks not only will vary in diameter but will often be slightly out of round or may have minor projections thereon. Consequently, blanks whose shank diameters are smaller than those of adjacent blanks may not be properly engaged with the arcuate member 46 and thus would be free to move relative to the carrier when they are engaged by the saw. This not only results in likelihood of spoilage of the work but also frequently causes premature dulling of the saw as well as bending and/or breakage thereof.

In accordance with this invention, the aforementioned difficulties are eliminated by so constructing the novel carrier member 15 that the blanks B are each individually properly maintained immovable relative to the carrier during the machining operation regardless of variations of diameter of the shanks or other defects of the blanks. This is achieved in the illustrated embodiment by providing the carrier member 15 with a plurality of movable members or plungers 52 of which there is one corresponding to each recess or groove 21. The plungers 52 preferably have disk-like heads axially slidable within axially extending counterbores 53 extending from the rear face of the carrier 15 to a location adjacent to but short of the bottoms of the recesses 21. The plungers 52 also each have a reduced diameter portion, extending through a bore of corresponding diameter communicating the counterbore 53 with the corresponding recess 21 adjacent the heads of the blanks, the plunger members 52 being of a length such that their forward ends engage the shanks of the blanks B and firmly hold the latter in engagement with the arcuate member 46 as the carrier member rotates past the latter. The plungers, however, ordinarily do not project so far forwardly within the recesses 21 but that the shanks of normal sized blanks can remain in engagement with the sides of the recess. However, where a blank is of abnormally small diameter it may not contact both sides of the recess and yet will be properly held from movement relative to the carrier by the plungers 52.

Individual axial movement of the plungers 52 is provided, while maintaining an axial force thereon and on the adjacent plungers, by providing an annual ring 54 of resilient material, such as rubber, neoprene or the like, which is disposed in an annular recess on the rear face of the carrier 15 and extends over the enlarged head-like portions of each of the plungers 52. Overlying the ring 54 of resilient material is a ring or annular member 55 of flexible metal, preferably spring steel or the like. The outer periphery of the ring 55 is secured between the carrier member 15 and the forward face of the flange 14 on the spindle 13 by having openings for reception of the screws 16 which secure the carrier to the flange. Rearwardly of the ring 55 the flange 14 is counterbored to a diameter slightly greater than the diameter of a circle passing tangent to the counterbores 53 so that the inner periphery of the flexible ring 55 can flex when a plunger 52 encounters an oversize shank of a blank.

It will be apparent that the construction just described is such that the plungers 52 are individually effective, in combination with the sides of the recesses 21 and the stationary member 46, to maintain the blanks B against movement relative to the carrier during rotation of the latter past the saw 22 or other machining tool so that the aforementioned difficulties which occurred in prior art machines when slight variations in blank sizes were encountered is obviated.

After the blanks have passed beyond the saw 22 or other tool they shortly thereafter pass beyond the end of the arcuate member 46 and the member 44 connected thereto and the blanks may then be discharged from the machine by suitable ejecting means located behind the portion of the cover plate, designated 56, as will be understood by those skilled in the art. After the blanks have been discharged the carrier member 15 continues its rotation until the now empty recesses 21 are sequentially brought adjacent the transfer or feeding wheel 39 where they can receive new unslotted blanks B.

Although the invention has been described as embodied in a machine for sawing slots or grooves in the heads of screw blanks, it will be understood that the invention may be employed for other purposes wherever similar problems are encountered. It will also be evident that by this invention it is now possible to place the recesses or grooves 21 more closely adjacent each other than has been heretofore possible since variations in the diameters of the blanks no longer prevent adjacent blanks from being properly held. Consequently, the rate of production can be greatly increased with less spoilage of the blanks and/or damage to the tools than has been possible heretofore.

Numerous changes and modifications in the mechanism can be effected by those skilled in the art after having had the advantage of this disclosure. Thus, in certain instances it is not necessary that both the resilient material 54 and the metal backing 55 be employed. Also, means other than the rubber-like member 54 and the metallic ring 55 may be provided to effect the necessary resilient clamping action of the plungers 52 upon the blanks. Thus, in certain instances individual coil springs could be provided for the plungers. Moreover, in some installations the plungers 52 may be replaced by other suitable movable members of which at least one is provided for each recess. These and other changes in the construction which may be made by those skilled in the art are all deemed as coming within the ambit of the invention and, hence, the latter is not to be construed as restricted to the specific details of the apparatus here illustrated and described except as may be required by the spirit and scope of the appended claims.

Having thus described the invention, I claim:

1. An apparatus of the character described comprising a rotatable carrier member having a plurality of radially extending recesses in an end face, each of which recesses is adapted to receive the shank of a headed blank at a loading station with a portion of the side of the shank extending beyond the end face of the member and convey it in an arcuate path through a work station, means for continuously rotating said carrier member, a blank-engaging member juxtaposed to said end face of said carrier member and past which said end face of said carrier member rotates in close proximity, said blank-engaging member extending from adjacent to said loading station to a location beyond said work station and cooperating with the carrier member to hold blanks in said recesses against movement therein, means for preventing rotation of said blank-engaging member with said carrier member, a plurality of plungers slidably supported by said carrier member for movement toward and from said blank-engaging member with their forward ends projecting into said recesses and adapted to engage blanks positioned therein, and resilient means on said carrier member and in engagement with rear ends of said plungers for biasing said plungers individually toward said blank-engaging member to maintain the blanks in firm engagement with the said blank-engaging member as the carrier member rotates therepast.

2. An apparatus of the character described comprising a rotatable carrier member having a plurality of radially extending recesses in an end face, each of which recesses is adapted to receive the shank of a headed blank at a loading station with a portion of the side of the shank extending beyond the end face of the member and convey it in an arcuate path through a work station, means for continuously rotating said carrier member, a blank-engaging member juxtaposed to said end face of said carrier member and past which said end face of said carrier member rotates in close proximity, said blank-engaging member extending from adjacent to said loading station to a location beyond said work station and cooperating with the carrier member to hold blanks in said recesses against movement therein, means for preventing rotation of said blank-engaging member with said carrier member, a plurality of plungers supported in said carrier member for movement toward and from said blank-engaging member with their forward ends projecting into said recesses and adapted to engage blanks positioned therein, an annular ring of resilient material supported on said carrier ring and overlying the rear ends of said plungers, and a flexible metallic annular member overlying said resilient material and secured to said carrier member adjacent to one peripheral edge of said metallic member with the other peripheral edge thereof free to flex, thereby providing for individual variation in the positions of said plungers while holding the blanks in firm engagement with the blank-engaging member.

References Cited in the file of this patent

UNITED STATES PATENTS

| | | |
|---|---|---|
| 14,041 | Whipple | Jan. 1, 1856 |
| 1,931,699 | Hubbell, Jr. | Oct. 24, 1933 |
| 2,621,343 | Fray | Dec. 16, 1952 |